United States Patent
Kim et al.

(10) Patent No.: US 7,241,146 B1
(45) Date of Patent: Jul. 10, 2007

(54) SHORE POWER WIRE HARNESS

(75) Inventors: Jeffrey C. Kim, Portland, OR (US); Michael T. Panich, Columbia, MD (US); Vincent Mangano, North Bend, WA (US)

(73) Assignee: Shurepower, LLC, Rome, NY (US)

( * ) Notice: Subject to any disclaimer, the term of this patent is extended or adjusted under 35 U.S.C. 154(b) by 0 days.

(21) Appl. No.: 11/376,529

(22) Filed: Mar. 15, 2006

(51) Int. Cl.
*H01R 33/00* (2006.01)

(52) U.S. Cl. .............................. 439/34; 439/4; 439/35

(58) Field of Classification Search ................ 439/35, 439/501, 638, 4, 34
See application file for complete search history.

(56) References Cited

U.S. PATENT DOCUMENTS

| | | | | |
|---|---|---|---|---|
| 2,391,141 A | * | 12/1945 | Dour et al. ............ 191/12.2 R |
| 5,034,571 A | * | 7/1991 | Galloway .............. 191/12.2 A |
| 5,053,583 A | * | 10/1991 | Miller et al. ................... 174/36 |
| 5,534,665 A | * | 7/1996 | Long ......................... 174/72 A |
| 5,669,471 A | * | 9/1997 | Unze ..................... 191/12.2 R |
| 5,733,141 A | * | 3/1998 | Penrod ....................... 439/501 |
| 5,893,777 A | | 4/1999 | Kantor |
| 6,109,957 A | * | 8/2000 | Fladung ...................... 439/501 |
| 6,121,551 A | * | 9/2000 | Dobrow .................. 174/113 R |
| 6,264,016 B1 | * | 7/2001 | Bales ......................... 191/12.4 |
| 6,637,166 B2 | * | 10/2003 | Kinsey ..................... 52/220.8 |
| 6,750,410 B2 | * | 6/2004 | Lee ........................... 200/51.03 |
| 7,052,282 B2 | * | 5/2006 | Meleck et al. ................ 439/34 |
| 2006/0137373 A1 | * | 6/2006 | Williams ..................... 62/236 |
| 2006/0144612 A1 | * | 7/2006 | Johansson .................... 174/95 |

* cited by examiner

*Primary Examiner*—Tho D. Ta
*Assistant Examiner*—Vanessa Girardi
(74) *Attorney, Agent, or Firm*—Thomas M. Johnston; Holland & Knight LLP

(57) ABSTRACT

A wire harness for a truck, truck and trailer, a recreational vehicle or bus includes a rear removable connector positioned adjacent to the rear of the vehicle, a first cable attached to the bottom of the vehicle having one end attached to the rear removable connector and the other end attached to the vehicle's electrical load. The vehicle's electrical load is enabled when the rear removable connector is connected to an external power source, which is generally known as shore power.

6 Claims, 3 Drawing Sheets

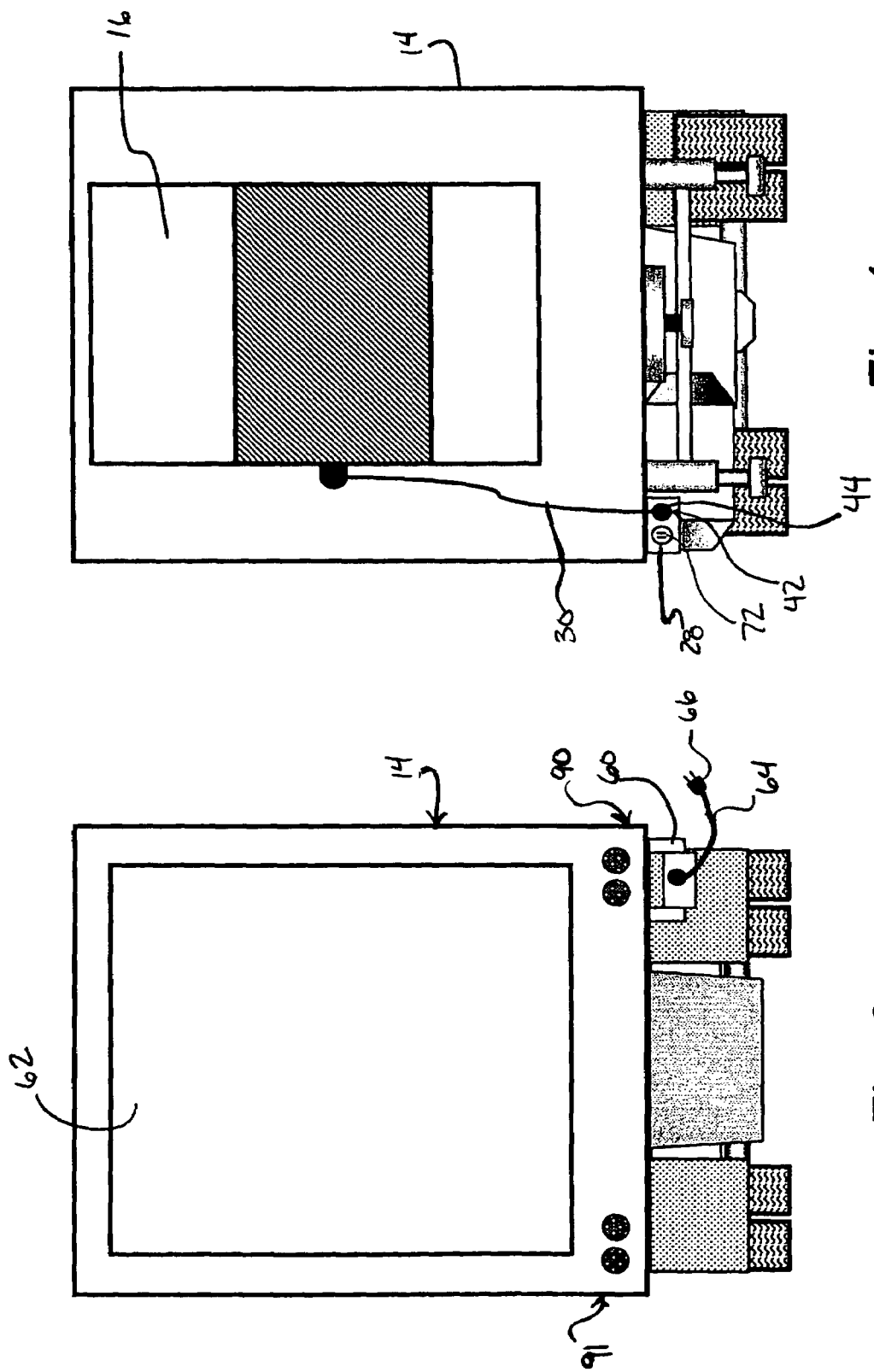

SHORE POWER WIRE HARNESS

FIELD OF INVENTION

The present invention relates to wire harnesses and more specifically to wire harnesses to connect a truck, a truck and trailer, a recreational vehicle or a bus to shore power.

BACKGROUND

Long-haul truck drivers typically idle their engines at truck stops or other locations to maintain power to the sleeping compartment of the tractor and, in colder climates, to keep the motor warm to avoid starting problems that might delay delivery of the cargo. Further, some trucks have a trailer that includes a refrigeration unit that requires constant power to avoid spoilage of cargo, which requires power from a diesel powered Trailer Refrigeration Unit (TRU), external power or a separate generator. External power is generally known as shore power.

Federal hours-of-service rules regulate mandatory rest periods for truck drivers, but state and local laws, in an effort to reduce fuel consumption and toxic emissions, may limit the time trucks and buses can idle. Therefore, there is a need to have an easy way for truck drivers to connect to shore power to maintain power to the sleeping compartment of the tractor and accessories used to keep the truck engine warm, as well as power refrigeration units on trailers that have them.

Truck drivers typically prefer to back into parking spaces so that they can easily pull out with other vehicles parked in close proximity, thereby reducing the risk that they will hit one of those vehicles. Also, when unloading a trailer, trucks are often backed towards a building and into a loading dock. In either situation, an external power source is then located at the rear of the truck. However, truck connections for external power are typically located on the tractor, which is at the front of the truck. In trailers with refrigeration units, which are typically located at the front of the trailer, connections to external power is usually located on the refrigeration unit itself or close to it. Both situations require a truck driver who backs into a parking space or loading dock to carry a long extension cord to run the length of the trailer to connect to an external power source. Trailers can be sixty feet long, resulting in a large and heavy extension cord that is difficult to handle. Further, a lose extension cord lying on the ground along the trailer can be a hazard for those walking by the truck as well as a hazard for the truck driver if the extension cord is lying in water or debris on the ground.

SUMMARY

The present invention provides a permanently mounted wire harness on a truck trailer to provide a connection, such as an inlet, to an external power source at the rear of the truck.

In general, in one aspect, the invention features a wire harness for a vehicle having a bottom surface, a front end, a back end, and an electrical load, the wire harness includes a rear removable connector positioned adjacent the back end of the vehicle, a first cable attached to the bottom surface of the vehicle having a first end attached to the rear removable connector and a second end attached to the electrical load, so that the electrical load may then be enabled by an external power source when the rear removable connector is connected to the external power source.

In embodiments, the wire harness may also include a protective cover having an inner surface and an outer surface that may be attached adjacent to the bottom surface of the vehicle and surrounds at least a portion of the first cable. In certain embodiments, the protective cover may be metal conduits, plastic conduits, box-shaped conduits, or U-shaped channels.

In other embodiments, the wire harness may also include a winding wheel adjacent to the back end of the vehicle to move the rear removable connector away from the back end of the vehicle when the winding wheel is unwound and pull the rear removable connector towards the back end of the vehicle when the winding wheel is wound.

In embodiments, the electrical load may be a heater, an air conditioner, a television, a microwave, a computer, a fan, a radio, a compact disc player, a VCR, a DVD player, an engine heater, a telephone, a light, a refrigerator, a refrigeration unit or other appliances. In still other embodiments, the first cable may be multiple wires, including electrical wires and data wires.

In certain embodiments, the wire harness may also include a front removable connector located adjacent the front end of the vehicle. In such embodiments, the second end of the cable attaches to the electrical load through the front removable connector, a removable plug, and a load cable having a load cable first end attached to the removable plug and a load cable second end attached to the electrical load, such that the removable plug is removably attached to the front removable connector. In embodiments, the vehicle may be a semi-truck, a truck, a bus or a recreational vehicle.

In other embodiments, the wire harness may also include a generator adjacent the bottom surface of the vehicle, an extension cable having a extension cable first end attached to the rear removable connector and an extension cable second end attached to the generator. The first end of the first cable is attached to the generator, which supplies electrical power to the electrical load when not connected to the external power source and is off when connected to the external power source.

In general, in another aspect, the invention features a wire harness for a semi-truck having a tractor, a trailer including a bottom surface, a front end, and a back end, and an electrical load. The wire harness includes a rear removable connector located adjacent to the back end of the trailer and a front removable connector located adjacent to the front end of the trailer. A protective cover is attached adjacent to the bottom surface of the trailer and has an inner surface and outer surface. An extension cable with a distal end attached to the front removable connector and a proximal end attached to the rear removable connector is located within the protective cover adjacent to the protective cover inner surface. A tractor cable with a distal end connected to the electrical load and a proximal end attached to a tractor cable removable connector is removably attached to the front removable connector. The electrical load may thus be driven by an external power source when the rear removable connector is connected to an external power source.

In embodiments, the wire harness also has a winding reel adjacent to the back end of the trailer and a windable cable on the winding reel. The extension cable may be attached to the rear removable connector by the windable cable, and the winding reel may move the rear removable connector from a position adjacent the back end of the trailer to a position spaced from the back end of the trailer such that the rear removable connector can be connected to external power, and the winding wheel may move the rear removable connector from a position spaced from the back end of the trailer to a position adjacent the back end of the trailer.

In other embodiments, the wire harness also includes an auxiliary cord with a distal end removably connectable to the rear removable connector and a proximal end removably connectable to an external source of power. In embodiments, the electrical load may be a heater, an air conditioner, a television, a microwave, a computer, a fan, a radio, a compact disc player, a VCR, a DVD player, an engine heater, a telephone, a light, a refrigerator, a refrigeration unit or other appliances. In other embodiments, the extension cable may be a plurality of wires capable of transmitting electrical current and data signals.

In general, in another aspect, the invention features a wire harness for a semi-truck having a tractor, a trailer including a bottom surface, a front end, a back end, a generator attached to the bottom surface between the front end and the back end, a refrigeration unit, and an electrical load. The wire harness includes a rear removable connector located adjacent to the back end of the trailer and a front removable connector located adjacent to the front end of the trailer. A first protective cover with an inner surface and outer surface is attached adjacent to the bottom surface of the trailer with a forward cable having a distal end attached to the front removable connector and a proximal end attached to the generator within the first protective cover adjacent the first protective cover inner surface. A second protective cover is attached adjacent to the bottom surface of the trailer and has an inner surface and outer surface and an extension cable, having a distal end attached to the generator and a proximal end attached to the rear removable connector, is located within the second protective cover adjacent to the second protective cover inner surface. A tractor cable having a distal end connected to the electrical load and a proximal end attached to a tractor cable removable connector is removably attached to the front removable connector. A refrigeration cable has a distal end connected to the refrigeration unit and a proximal end attached to the front removable connector. The electrical load and the refrigeration unit may thus be driven by an external power source when the rear removable connector is connected to the external power source.

In embodiments, the wire harness also includes a winding reel adjacent the back end of the trailer and a windable cable on the winding reel. The extension cable is attached to the rear removable connector by the windable cable so the winding reel may move the rear removable connector from a position adjacent the back end of the trailer to a position spaced from the back end of the trailer and the rear removable connector can be connected to external power. The winding wheel may move also the rear removable connector from a position spaced from the back end of the trailer to a position adjacent the back end of the trailer.

In other embodiments, the wire harness also includes an auxiliary cord having a distal end removably connectable to the rear removable connector and a proximal end removably connectable to an external source of power. In embodiments, the electrical load may be a heater, an air conditioner, a television, a microwave, a computer, a fan, a radio, a compact disc player, a VCR, a DVD player, an engine heater, a telephone, a light, a refrigerator, a refrigeration unit or other appliances.

In other embodiments, the extension cable may be several wires capable of transmitting electrical current and data signals. In still other embodiments, the proximal end of the refrigeration cable may be permanently attached to the front removable connector.

The invention can be implemented to realize one or more of the following advantages. A wire harness mounted to the trailer of a truck allows drivers to back into parking spaces and eliminates the need for a truck driver to carry a long, heavy extension cord in the truck which has to be uncoiled and recoiled every time the truck driver stops for a mandatory rest period. The wiring harness helps prevent the truck driver from being potentially exposed to bad weather for an extended period of time and having to spend time in a busy parking lot where there is a danger of being struck by an adjoining truck. Further, the need to lift a heavy extension cord in and out of the truck is eliminated, thereby alleviating the possibility of truck driver injury from such heavy lifting. Also, the wire harness eliminates the possibility of injury from a frayed extension cord lying along the trailer, as well as eliminates a tripping hazard. Further still, the wire harness may include additional cables for easier access to telephone, internet and cable television lines which long-haul trucks often incorporate into the tractors.

Other features and advantages of the invention are apparent from the following description, and from the claims.

BRIEF DESCRIPTION OF THE DRAWINGS

FIG. 3 is a rear view of the exemplary trailer of FIG. 1.

FIG. 4 is a front view of the exemplary trailer of FIG. 1.

Like reference numbers and designations in the various drawings indicate like elements.

DETAILED DESCRIPTION

Figure 1:
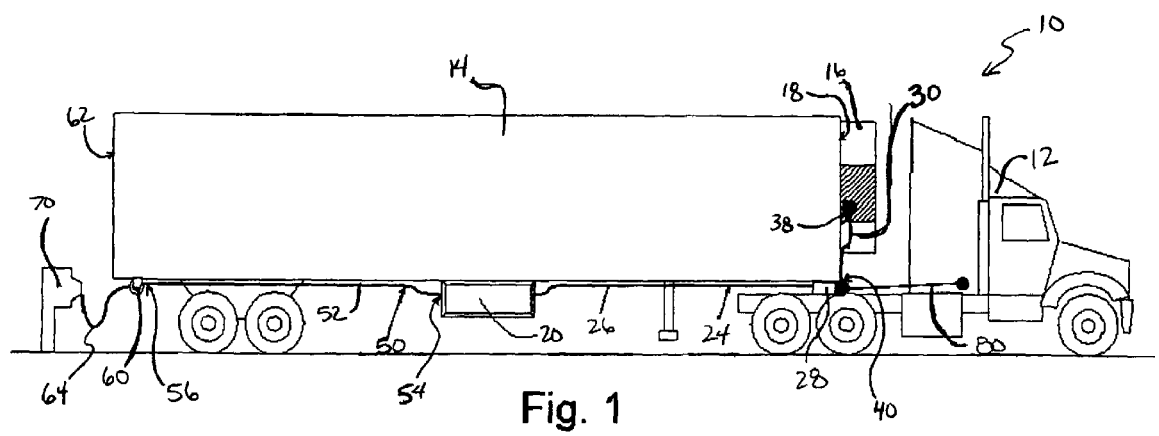
FIG. 1 is a side view of an exemplary truck with a wire harness according to one embodiment of the invention.
Figure 2:
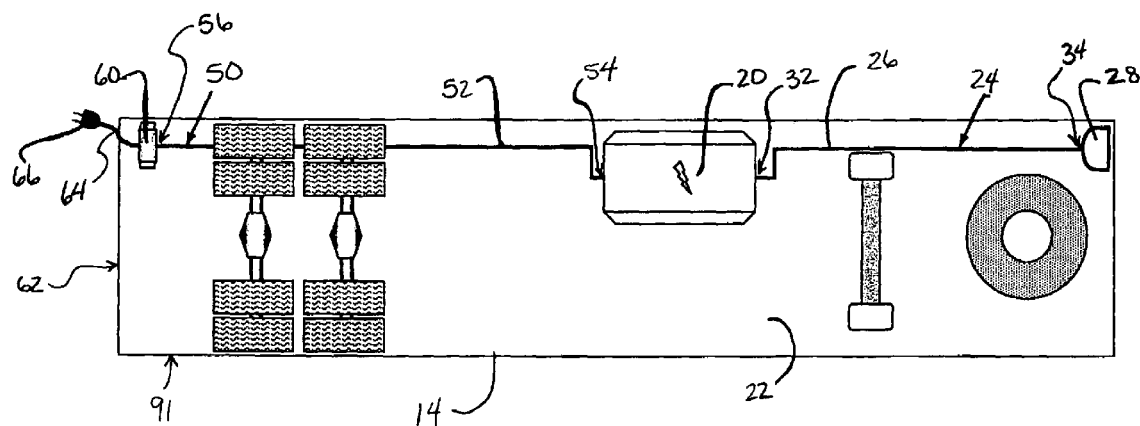
FIG. 2 is a bottom view of the exemplary trailer of FIG. 1.

Referring to FIGS. 1 and 2, a semi-truck 10 includes a tractor 12 and a trailer 14. The exemplary trailer 14 includes an electric-capable trailer refrigeration unit 16, generally known as an eTRU, at a front end 18 of the trailer 14. During transit, the refrigeration unit 16 may be powered by a generator 20 mounted to a bottom surface 22 of the trailer 14. The refrigeration unit 16 uses the generator 20 during transit of the trailer 14 to keep the refrigeration unit 16 operational when not connected to shore power or other source of power, such as when on a ship.

Figure 6:
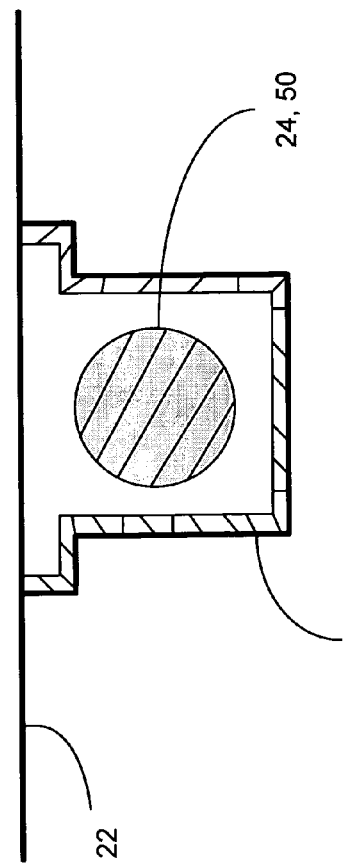
FIG. 6 is a cross section view of an exemplary cable within an exemplary protective cover.

The refrigeration unit 16 is connected to the generator 20 by a forward cable 24 and a refrigeration cable 30. The forward cable 24 may include wires to carry higher voltage 3-phase power, 120V power, cable television, internet or telephone service, or any combination thereof to both the refrigeration unit 16 or the tractor 12, as described below. The forward cable 24 is run in a protective cover 26 (FIG. 6), such as a metal or plastic conduit, which is attached adjacent to the bottom surface 22 of the trailer 14. The protective cover 26 can be attached to a frame, a floor panel or any other suitable structure along the bottom surface 22 of the trailer 14. The protective cover 26 helps protect the forward cable 24 from weather, road debris and other hazards that could degrade or damage the forward cable 24. Also, the protective cover 26 may incorporate strain relief devices to further protect the forward cable 24. The forward cable 24 connects to the generator 20 at a first end 32 and to a service outlet 28 at a second end 34. A refrigeration cable 30 is attached at a first end 38 to the refrigeration unit 16 and to the service outlet 28 at a second end 40. The portion of the forward cable 24 that carries the higher voltage 3-phase power is hardwired to an outlet 42 (FIG. 4), such as a female plug connector. The second end 40 of the refrigeration cable 30 includes a removable connector 44 (FIG. 4), such as a male plug connector. Since most electric-capable trailer refrigeration units require a higher voltage 3-phase power, the removable connector should include a circuit interlock to ensure that the electrical load is removed before the removable connector 44 is removed from the outlet 42.

An extension cable 50 is provided in a second protective cover 52 (FIG. 6), such as a metal or plastic conduit, which is attached adjacent the bottom surface 22 of the trailer 14. The extension cable 50 may include wires to carry higher voltage 3-phase power, 120V power, cable television, internet or telephone service, or any combination thereof. The second protective cover 52 can be attached to the frame, the floor panel or any other suitable structure along the bottom surface 22 of the trailer 14. The second protective cover 52 helps protect the extension cable 50 from weather, road debris and other hazards that could degrade or damage the extension cable 50. Also, the second protective cover 52 may incorporate strain relief devices to further protect the extension cable 50. The extension cable 50 attaches to the generator 20 at a second end 54 and attaches to a windable cable 64 within a cord winding reel 60 at a first end 56. The windable cable 64 may include wires to carry higher voltage 3-phase power, 120V power, cable television, internet or telephone service, or any combination thereof. The cord winding reel 60 is located near or adjacent to a back end 62 of the trailer 14. While the cord winding reel 60 is shown on the passenger side of the trailer 14, the cord winding reel 60 may be mounted at any point adjacent to the back end 62 of the trailer 14. For example, if the trailer 14 is to be used at a loading dock, the cord winding reel 60 is preferably facing a driver's side 91 of the trailer 14 to enable access and visibility to the truck driver. The windable cable 64 includes a second removable connector 66 at its distal end. The windable cable 64 is capable of being wound and un-wound on the cord winding wheel 60. The cord winding reel 60 may be a manually operated unit or an electrically powered unit. When in the wound position, the windable cable 64 is stored within the cord winding wheel 60 and the second removable connector 66 is adjacent the cord winding reel 60. When in the un-wound position, the windable cable 64 extends from the back end 62 of the trailer 14 so that the windable cable 64 can be connected to shore power, such as at a shore power pedestal 70 through the second removable connector 66.

The shore power pedestal 70 may provide the higher voltage 3-phase power for the refrigeration unit 16 as well as 120V power for any hotel load in the tractor 12. Hotel load is any electrical equipment within the tractor 12, such as televisions, heaters, air conditioners, microwaves, computers or any other electrical equipment a truck driver might use in the tractor. Further, the shore power pedestal may provide cable, internet or telephone connections, or any combination thereof. The windable cable 64, the second removable connector 66 and the extension cable 50 are each capable of carrying any one or all of these loads.

When connected to the shore power pedestal 70, the refrigeration unit 16 is powered from the higher voltage 3-phase power provided and the generator 20 is bypassed. If 120V power is provided, the portion of extension cable 50 that carries the 120V may be connected directly to the portion of the forward cable 24 that carries the 120V, or connected through the generator 20. If connected through the generator, the 120V only passes through the generator 20. Similarly, if internet, cable television or telephone service is provided by the shore power pedestal 70, the portion of the extension cable 50 that carries the specific load may be connected directly to the portion of the forward cable 24 that carries the corresponding load, or connect through the generator 20.

Figure 5:
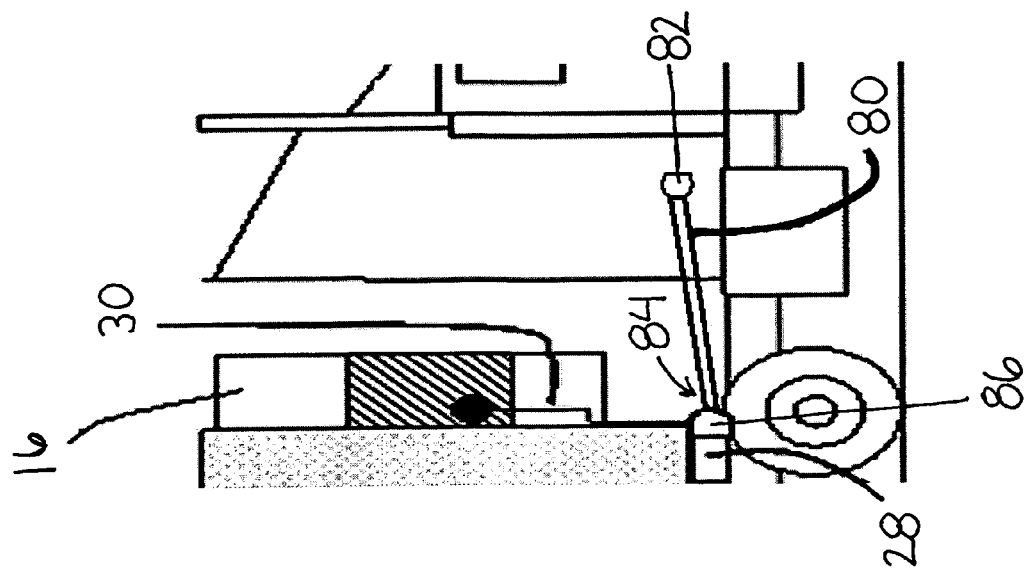
FIG. 5 is a side view of an exemplary truck with a tractor cable removable connector according to one embodiment of the invention.

The forward cable 24 carries the various loads to a second outlet 72 in service outlet 28. The second outlet 72 may include female plug connectors for 120V power, internet, cable television or telephone service, or any combination thereof. These hotel loads are then connected to the tractor 12 by a tractor cable 80 that includes wires for each of the provided loads. The tractor cable 80 has a distal end 82 connected to the electrical load and a proximal end 84 attached to a tractor cable removable connector 86 which is removably attached to the service outlet 28 (FIG. 5).

The refrigeration cable 30 and the tractor cable 80 may both be connected to the service outlet 28 at the time the trailer 14 is attached to tractor 12. With the refrigeration unit 16 and tractor 12 connected to the service outlet 28, a truck driver only has to walk to the back of the truck 10, unwind the necessary length of the windable cable 64 and plug into the shore power pedestal 70 or other shore power source, such as at a loading dock. This connection will then power the refrigeration unit 16 and hotel loads during the truck driver's mandatory rest period without idling the truck's engine. Further, by having the connection at the back of the truck, there is no long extension cord to be run alongside the trailer 14, or on the ground.

It is to be understood that the foregoing description is intended to illustrate and not to limit the scope of the invention, which is defined by the scope of the appended claims. Other embodiments are within the scope of the following claims. For example, while the protective covers 26, 52 have been described as attaching to the bottom surface 22 of the trailer 14, the protective covers 26, 52 can be attached adjacent the bottom surface, such as to a lower edge 90 of the trailer 14. Further, while the protective covers 26, 52 are shown attached to the right side of the bottom surface 22, they can attach anywhere along the bottom surface 22, and preferably along the driver's side 91 of the trailer 14.

Also, while, the portion of the forward cable 24 that carries the higher voltage 3-phase power and the refrigeration cable 30 were described as being removably connected at service outlet 28, they may be hard wired together at the service outlet 28.

Further still, while a cord winding wheel 60 and windable cable 64 have been disclosed, the extension cable 50 may terminate at the back 62 of the trailer 14 in a removable connector. The truck driver would then use a short extension cord to connect the extension cable 50 to the shore power pedestal 70 or other shore power source.

Also, the extension cable 50 and forward cable 24 may be a single cable with multiple wires to carry the various loads or may be broken down into multiple cables within the conduit. Further, on trailers without refrigeration units or without generators, the extension cable 50 and the forward cable 24 may be a single cable running the length of the trailer in a single protective cover. Also, while the protective covers have been described as conduits, the protective covers can also be box channels or "U-shaped" covers.

Further still, while the wire harness has been described as being used with a semi-truck (i.e., truck with a tractor and a trailer), the wire harness may be used with other types of trucks and buses. Also, while the refrigeration unit 16 has been described as using an external generator 20, the refrigeration unit 16 may have an internal generator instead, which can be powered by shore power through the wire harness.

What is claimed is:

1. A wire harness for a semi-truck having a tractor including an electrical load, a trailer including a bottom surface, a front end, a back end, a generator attached to the bottom surface between the front end and the back end, and a refrigeration unit, the wire harness comprising:

a rear removable connector located adjacent the back end of the trailer;

a front removable connector located adjacent the front end of the trailer;

a first protective cover attached adjacent to the bottom surface of the trailer, the first protective cover having an inner surface and outer surface;

a forward cable having a distal end and a proximal end, the forward cable located within the first protective cover adjacent the first protective cover inner surface, the distal end of the forward cable attached to the front removable connector and the proximal of the forward cable attached to the generator;

a second protective cover attached adjacent to the bottom surface of the trailer, the second protective cover having an inner surface and outer surface;

an extension cable having a distal end and a proximal end, the extension cable located within the second protective cover adjacent to the second protective cover inner surface, the proximal end of the extension cable attached to the rear removable connector and the distal end of the extension cable attached to the generator;

a tractor cable having a distal end and a proximal end, the distal end connected to the electrical load and the proximal end attached to a tractor cable removable connector, the tractor cable removable connector removably attached to the front removable connector; and a refrigeration cable having a distal end and a proximal end, the distal end of the refrigeration cable connected to the refrigeration unit and the proximal end of the refrigeration cable attached to the front removable connector;

wherein the electrical load and the refrigeration unit may be driven by an external power source when the rear removable connector is connected to an external power source.

2. The wire harness of claim 1 further comprising:

a winding reel adjacent the back end of the trailer; and a windable cable on the winding reel, the extension cable attached to the rear removable connector by the windable cable, the winding reel enabling moving the rear removable connector from a position adjacent the back end of the trailer to a position spaced from the back end of the trailer such that the rear removable connector can be connected to external power, and the winding wheel enabling moving the rear removable connector from a position spaced from the back end of the trailer to a position adjacent the back end of the trailer.

3. The wire harness of claim 1 further including an auxiliary cord having a distal end and a proximal end, the distal end removably connectable to the rear removable connector and the proximal end removably connectable to an external source of power.

4. The wire harness of claim 1 wherein the electrical load is selected from the group consisting of a heater, an air conditioner, a television, a microwave, a computer, a fan, a radio, a compact disc player, a VCR, a DVD player, an engine heater, a telephone, a light, a refrigerator, a refrigeration unit and other appliances.

5. The wire harness of claim 1 wherein the extension cable comprises a plurality of wires capable of transmitting electrical current and data signals.

6. The wire harness of claim 1 wherein the proximal end of the refrigeration cable is permanently attached to the front removable connector.

* * * * *